(12) United States Patent
Adachi et al.

(10) Patent No.: US 9,246,196 B2
(45) Date of Patent: *Jan. 26, 2016

(54) BATTERY UNIT

(71) Applicant: Sony Corporation, Tokyo (JP)

(72) Inventors: Tatsuya Adachi, Fukushima (JP);
Tsutomu Aoyama, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,639

(22) Filed: Jul. 6, 2015

(65) Prior Publication Data

US 2015/0311570 A1    Oct. 29, 2015

Related U.S. Application Data

(63) Continuation of application No. 13/276,789, filed on Oct. 19, 2011, now Pat. No. 9,077,018.

(30) Foreign Application Priority Data

Oct. 26, 2010    (JP) .................................. 2010-239849

(51) Int. Cl.
| | |
|---|---|
| *H01M 10/46* | (2006.01) |
| *H01M 2/10* | (2006.01) |
| *H01M 10/6551* | (2014.01) |
| *H02J 7/00* | (2006.01) |
| *H01M 6/02* | (2006.01) |

(Continued)

(52) U.S. Cl.
CPC ............ *H01M 10/46* (2013.01); *H01M 2/1077* (2013.01); *H01M 10/6551* (2015.04); *H02J 7/0013* (2013.01); *H02J 7/0042* (2013.01); *H01M 2/02* (2013.01); *H01M 6/02* (2013.01); *H01M 10/02* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 5,248,927 A | | 9/1993 | Takei et al. |
| 5,895,728 A | * | 4/1999 | Walker ................ H01M 2/0202 |
| | | | 429/160 |

(Continued)

FOREIGN PATENT DOCUMENTS

| | | |
|---|---|---|
| CN | 1442927 | 9/2003 |
| CN | 1914753 | 2/2007 |

(Continued)

OTHER PUBLICATIONS

Notification of the First Office Action issued in connection with Chinese Patent Application No. 201110319481.9, dated Nov. 2, 2014. (17 pages).

*Primary Examiner* — Edu E Enin-Okut
*Assistant Examiner* — Carmen Lyles-Irving
(74) *Attorney, Agent, or Firm* — K&L Gates LLP

(57) ABSTRACT

A battery unit may include a main accommodation casing that includes a power output terminal, at least one sub-module that is accommodated in the main accommodation casing and a control unit that is accommodated in the main accommodation casing and controls at least one of charging and discharging of a unit battery, wherein in the sub-module, two or more battery blocks are accommodated inside a sub-accommodation casing so that the terminals of the battery blocks each including a plurality of unit batteries are not exposed and the battery blocks are connected to each other through an electric connection member.

12 Claims, 17 Drawing Sheets

(51) Int. Cl.
  *H01M 2/02* (2006.01)
  *H01M 10/02* (2006.01)

(56) References Cited

U.S. PATENT DOCUMENTS

| | | | |
|---|---|---|---|
| 6,225,788 B1 | 5/2001 | Kouzu et al. | |
| 7,955,729 B2* | 6/2011 | Onuki | H01M 2/1022 |
| | | | 429/153 |
| 2007/0082265 A1 | 4/2007 | Itou et al. | |
| 2010/0129703 A1 | 5/2010 | Caumont et al. | |
| 2010/0248008 A1* | 9/2010 | Sugawara | H01M 2/1077 |
| | | | 429/159 |
| 2011/0293998 A1* | 12/2011 | Sato | H01M 2/1077 |
| | | | 429/159 |
| 2012/0164507 A1 | 6/2012 | Lachenmeier et al. | |

FOREIGN PATENT DOCUMENTS

| | | |
|---|---|---|
| CN | 101669247 | 3/2010 |
| JP | 2004-006413 | 1/2004 |
| JP | 2004-111098 | 4/2004 |
| JP | 2008-166009 | 7/2008 |
| JP | 2009-289429 | 12/2009 |

* cited by examiner

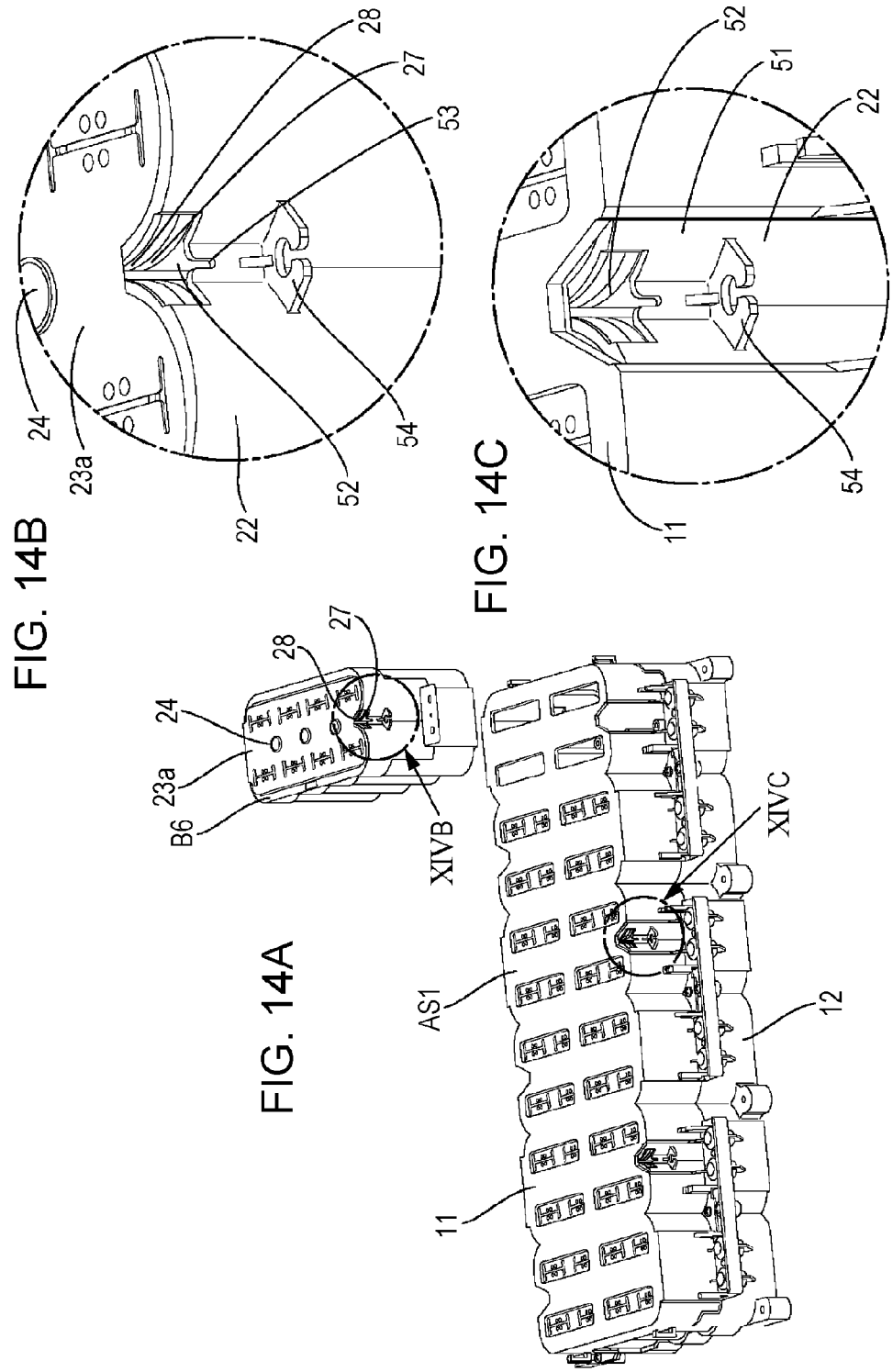

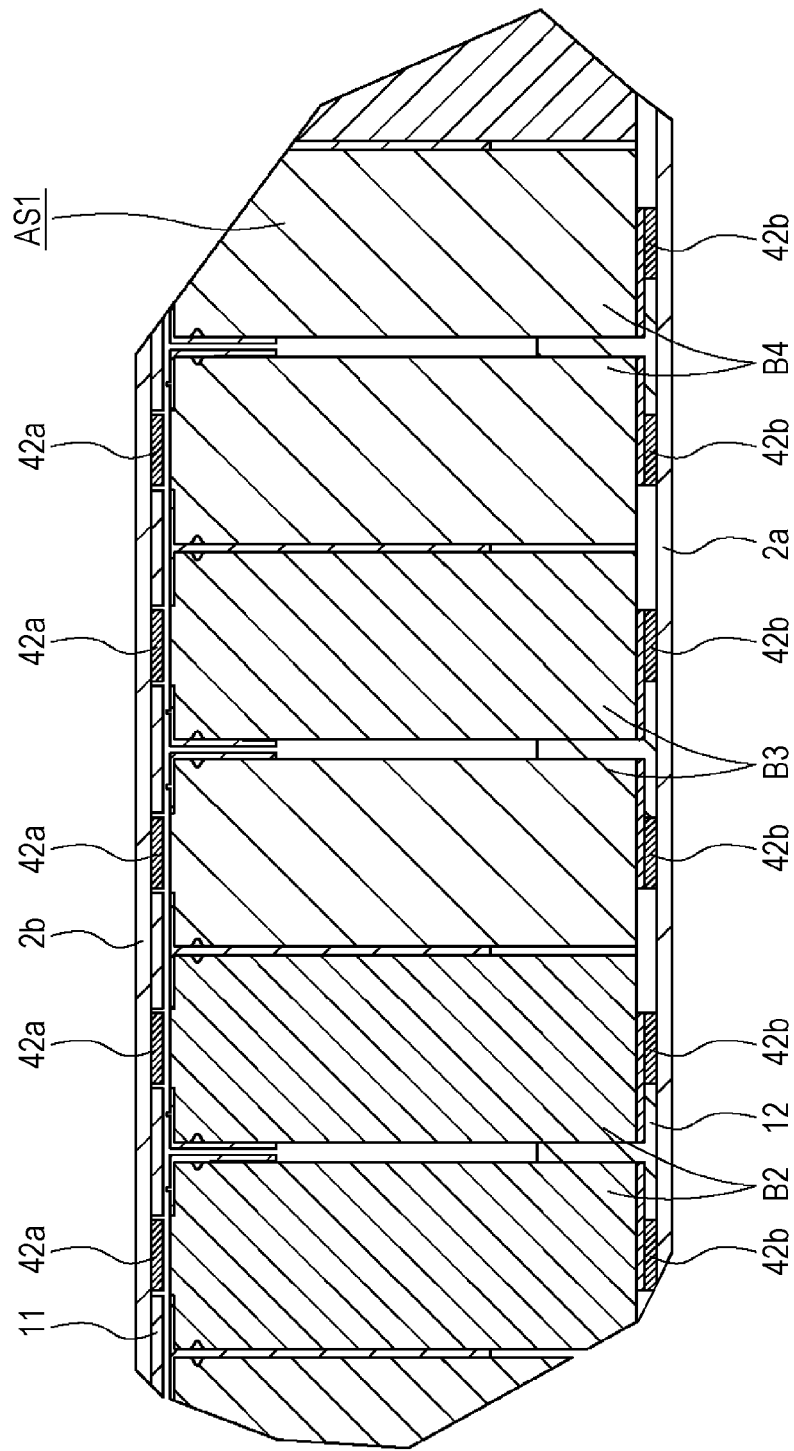

BATTERY UNIT

CROSS REFERENCES TO RELATED APPLICATIONS

The present application is a continuation of U.S. patent application Ser. No. 13/276,789, filed Oct. 19, 2011, which claims priority to Japanese Patent Application No. 2010-239849, filed on Oct. 26, 2010, the entire disclosure of each of which is hereby incorporated by reference herein.

BACKGROUND

The present disclosure relates to a battery unit. Specifically, the disclosure relates to a battery unit that includes a plurality of battery blocks.

In recent years, there has been a rapid expansion in the usage of secondary batteries such as a lithium ion battery as a storage battery for a vehicle, a solar battery, or a power storage battery combined with a new energy system such as wind power generation. In such a storage battery, generally, a battery block is formed by connecting a plurality of, for example, four unit batteries (called an electrical cell or a cell and appropriately referred to as a battery in the following description) to each other in parallel and/or in series. A plurality of battery blocks is accommodated in an external casing.

For example, Japanese Unexamined Patent Application Publication No. 2009-289429 discloses a structure in which a battery accommodation box as an external casing is divided by a division plate so as to form a plurality of battery accommodation spaces and a battery block is accommodated in each battery accommodation space.

SUMMARY

However, it is inconvenient to attach the plurality of battery blocks to a battery accommodation casing. Furthermore, since the work of electrically connecting and assembling the battery blocks is performed inside the casing, there is a danger that short-circuiting occurs due to components contacting and dropping during the work. Furthermore, when vibration or impact is applied to a battery accommodation box after the battery module is disposed inside the battery accommodation box, the fixed battery blocks may be separated from the fixed position, so that the batteries may be short-circuited to each other. Furthermore, when the battery accommodation box is formed of metal, there is a concern that short-circuiting may occur between the battery and the battery accommodation box.

Accordingly, it is desirable to provide a battery unit for which there is capability for performing efficient assembly work of the battery unit and short-circuiting during or after the assembly of the battery unit can be prevented.

In order to solve the above-described problem, there is provided a battery unit including: a main accommodation casing that includes a power output terminal; at least one sub-module that is accommodated in the main accommodation casing; and a control unit that is accommodated in the main accommodation casing and controls at least one of charging and discharging of a unit battery, wherein in the sub-module, two or more battery blocks are accommodated inside a sub-accommodation casing so that the terminals of the battery blocks each including a plurality of unit batteries are not exposed and the battery blocks are connected to each other through an electric connection member.

According to at least one embodiment, the sub-module may be assembled outside the main accommodation casing so that the positive and negative electrode terminals of the plurality of unit batteries constituting the battery block are covered by the insulating sub-accommodation casing. Then, the plurality of sub-modules is inserted and disposed inside the main accommodation casing. Accordingly, the attachment work may be further efficiently performed compared to the case where each battery block is attached into the main accommodation casing. Furthermore, since the assembly work of the battery block and the sub-module is performed outside the accommodation casing, the worry of short-circuiting may be reduced during the attachment work.

BRIEF DESCRIPTION OF THE FIGURES

Embodiments of the present application will be described below in detail with reference to the drawings.

FIGS. 14A, 14B, 14C are perspective views illustrating attachment of a heat radiation rubber.

FIG. 16 is a perspective view illustrating an example of a structure provided to attach a thermistor.

Figure 1:
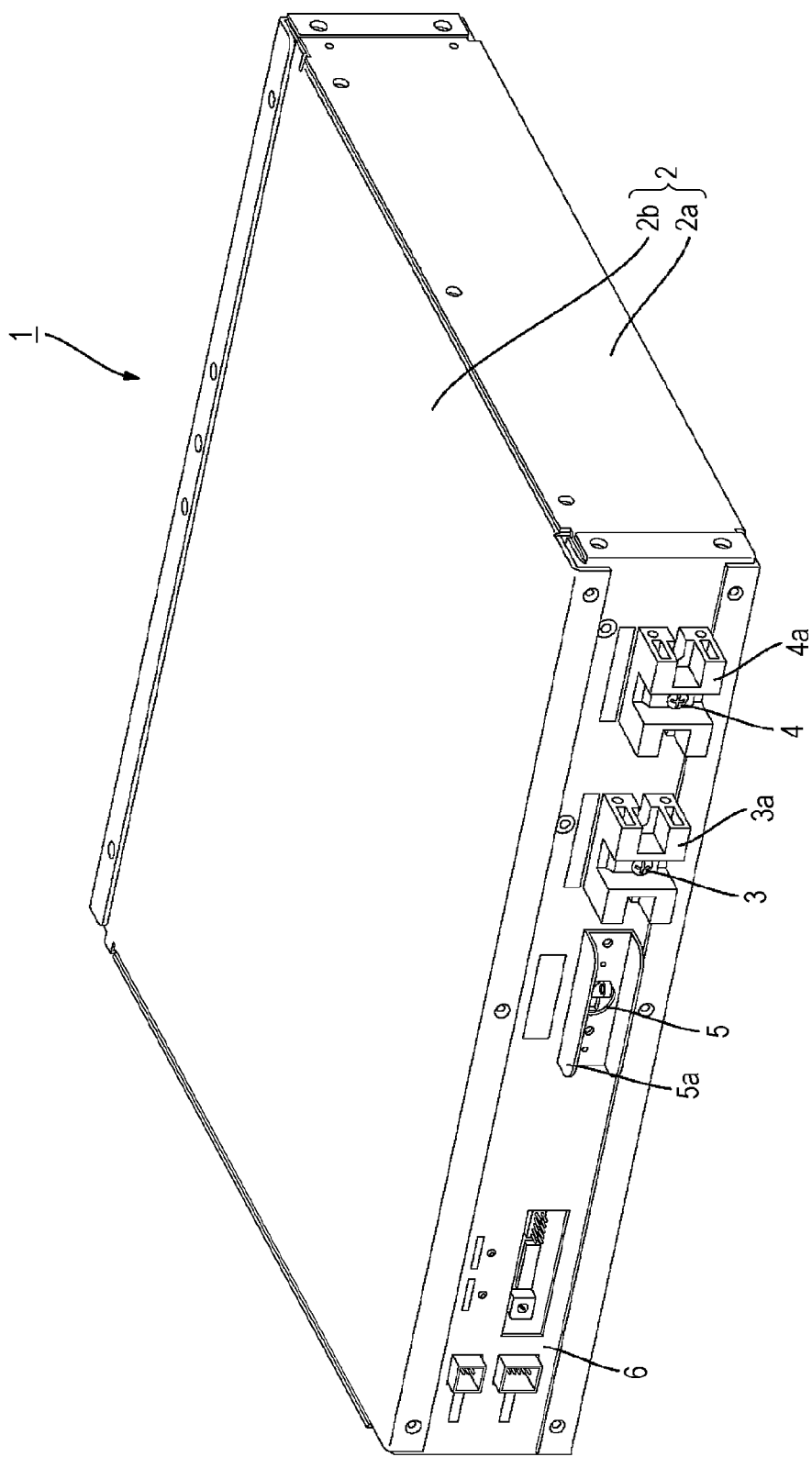
FIG. 1 is a perspective view illustrating an example of an appearance of a battery unit according to one embodiment.

Additional features and advantages are described herein, and will be apparent from the following Detailed Description and the figures.

DETAILED DESCRIPTION

Overall Structure of Battery Unit

Hereinafter, a battery unit will be described by referring to the drawings.

FIGS. 1 to 5 are perspective views illustrating an overall structure of a battery unit 1. An external casing 2 as a main accommodation casing of the battery unit 1 includes an external lower casing 2a and an external upper casing 2b which are formed of metal by sheet-metal processing. It is desirable to use a material having a high heat transfer rate and a radiation rate as a material of the external lower casing 2a and the external upper casing 2b. Accordingly, an excellent casing heat radiation property may be obtained, and an increase in temperature inside the casing may be suppressed. Due to the excellent casing heat radiation property, an opening of the casing 2 may be minimized or removed, and high dust-proofness and drip-proofness may be realized. For example, the material of the external lower casing 2a and the external upper casing 2b may be aluminum, aluminum alloy, copper, or copper alloy. For example, the sheet thickness of each of the external lower casing 2a and the external upper casing 2b may be about 1 mm or more.

The rear surface of the casing 2 is provided with an external positive electrode terminal 3 and an external negative electrode terminal 4 which are used to perform charging and discharging of the battery unit 1. A short-circuit prevention wall 3a is provided at both sides of the external positive electrode terminal 3 so as to prevent short-circuiting between terminals. A short-circuit prevention wall 4a is provided at both sides of the external negative electrode terminal 4 so as to prevent short-circuiting between terminals.

Figure 4:
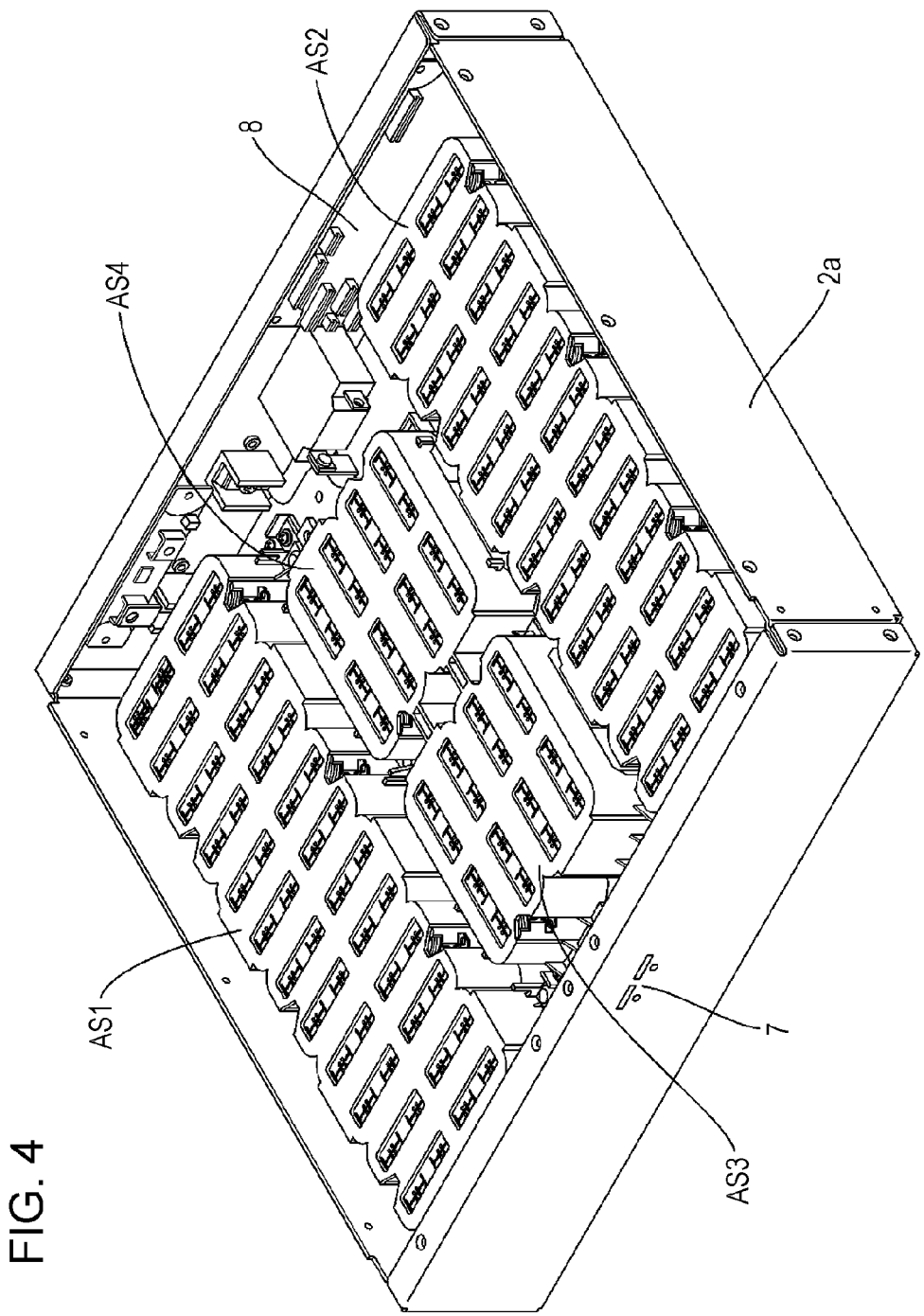
FIG. 4 is a perspective view illustrating a state where the external upper casing is detached.
Figure 5:
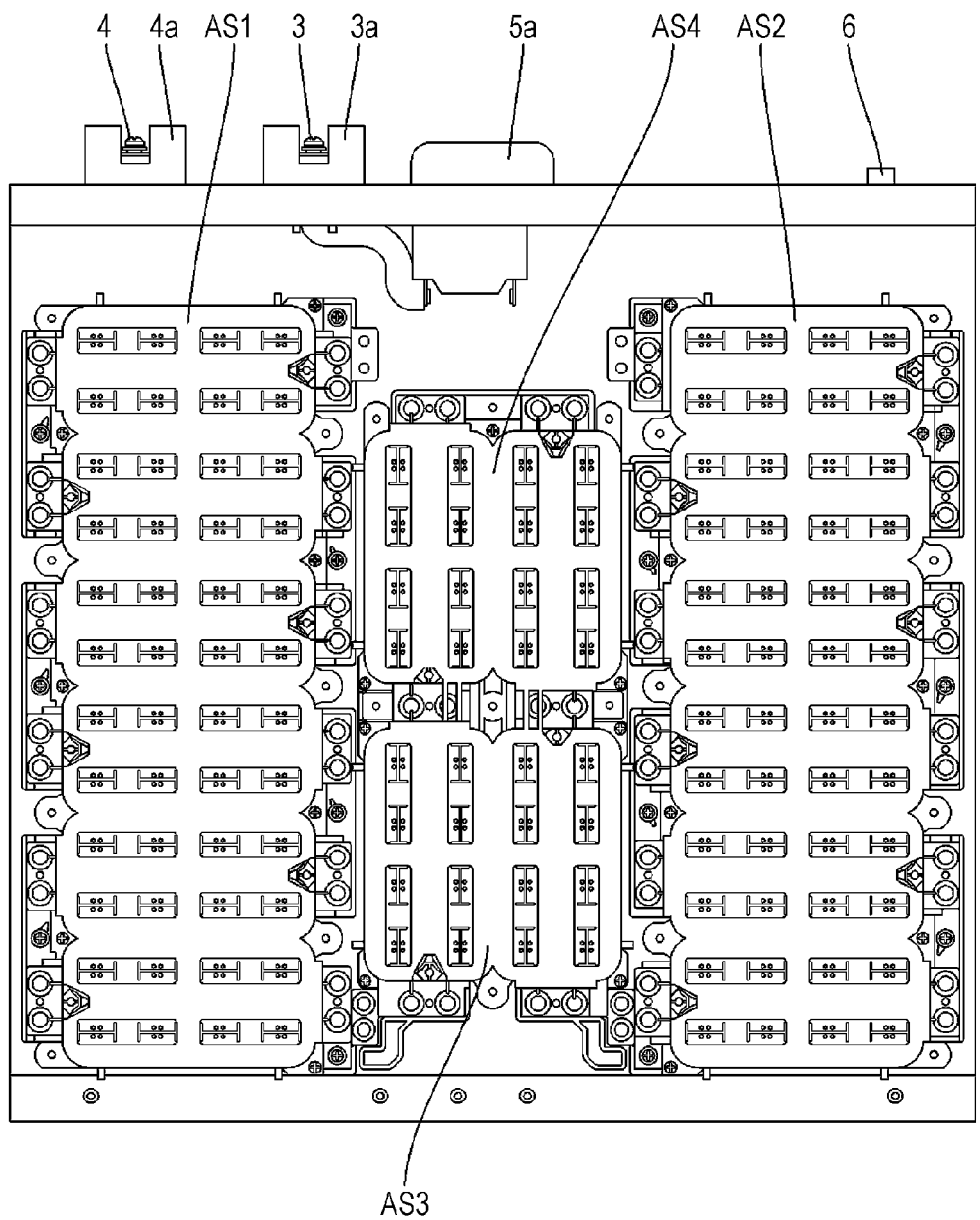
FIG. 5 is a plan view illustrating a state where the external upper casing is detached.

Furthermore, a current breaker 5 is provided at the rear surface of the battery unit 1. Since the current breaker 5 is provided, the safety of the battery unit may improve. A malfunction prevention component 5a is provided around the current breaker 5. Furthermore, a connection portion 6 is provided so as to be connected to a control circuit disposed inside the casing 2. The control circuit is provided so as to monitor the temperature of the battery unit and controls charging, discharging, and the like. As shown in FIG. 4, a substrate of a control block 8 is accommodated therein. Furthermore, the front surface of the casing 2 is provided with a display element 7 such as an LED displaying an operation state as shown in FIG. 4.

Figure 2:
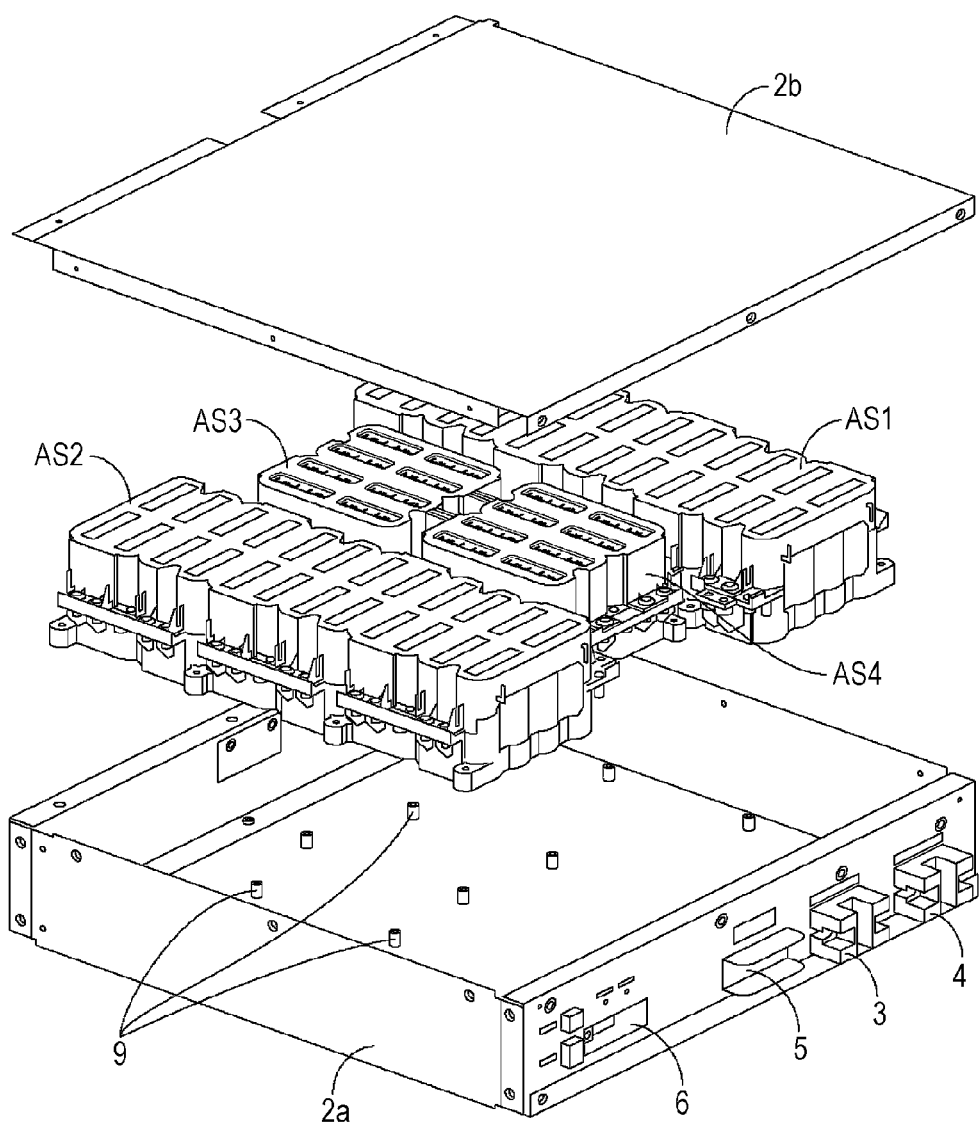
FIG. 2 is an exploded perspective view illustrating an example of the battery unit according to one embodiment.
Figure 3:
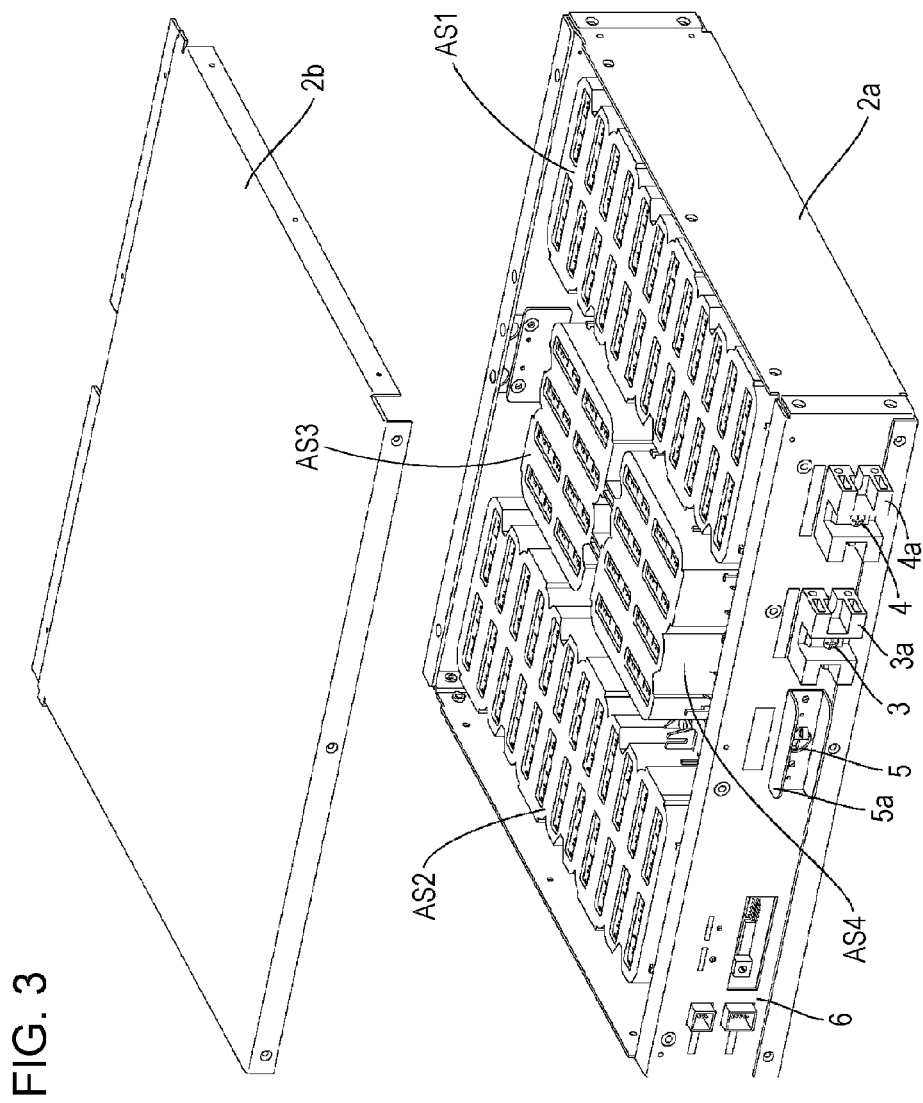
FIG. 3 is a perspective view illustrating a state where an external upper casing is detached.

As shown in FIGS. 2 to 5, the external lower casing 2a of the casing 2 is formed in a box shape, and the external upper casing 2b is provided so as to cover the opening thereof. Sub-modules AS1 to AS4 are accommodated inside an accommodation space of the external lower casing 2a. As shown in FIG. 2, a plurality of bosses 9 is formed at the bottom surface of the external lower casing 2a so as to fix the sub-modules AS1 to AS4 by threading or the like. The sub-modules AS1 to AS4 may be assembled in advance outside the casing 2.

Figure 6:
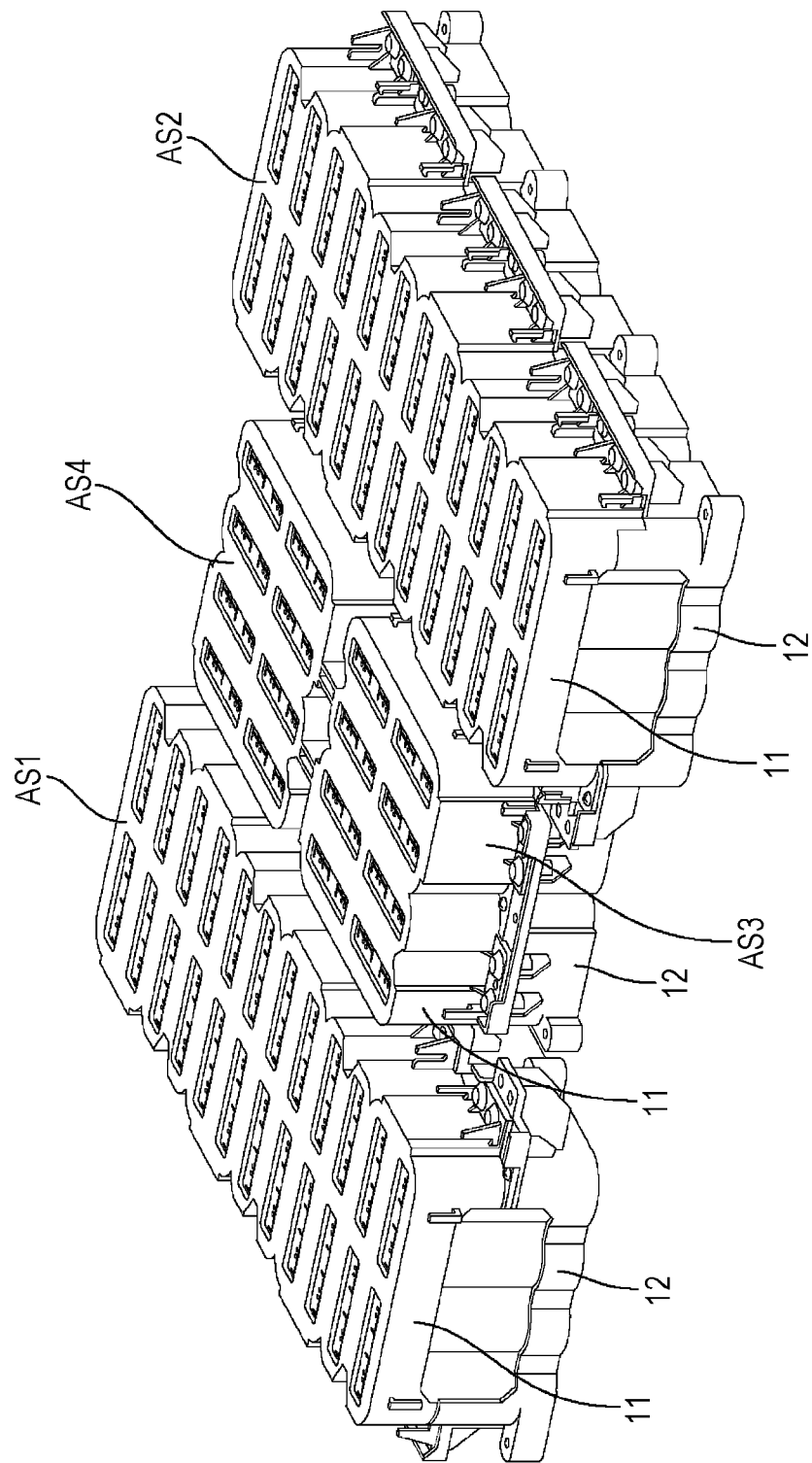
FIG. 6 is a perspective view illustrating a sub-module accommodated inside an external casing.

FIG. 6 only shows the sub-modules AS1 to AS4. As shown in FIG. 6, each sub-module is provided by integrating a plurality of battery blocks using an insulation casing (an upper casing 11 and a lower casing 12) as a sub-accommodation casing. A molding component such as plastic may be used as the upper casing 11 and the lower casing 12. In the sub-modules AS1 to AS4, the plurality of battery blocks is accommodated inside the upper casing 11 and the lower casing 12 so that the positive and negative electrode terminals of the battery block are not exposed.

Each battery block is provided by connecting, for example, eight cylindrical lithium ion secondary batteries in parallel to each other. Each of the sub-modules AS1 and AS2 is provided by integrating six battery blocks through the upper casing 11 and the lower casing 12. Each of the sub-modules AS3 and AS4 is provided by integrating two battery blocks through the upper casing 11 and the lower casing 12. Accordingly, sixteen battery blocks are provided in total as understood by "6+6+2+2=16". These battery blocks are connected to each other, for example, in series.

Connection Between Battery Blocks

In each of the sub-modules AS1 to AS4, a connection metallic sheet, for example, a bus-bar is used so as to connect the battery blocks to each other in series. The bus-bar is thin and elongated bar-like metal. The bus-bar is provided with a plurality of holes used for connection with a connection metallic sheet or the like derived from the battery block.

Figure 7:
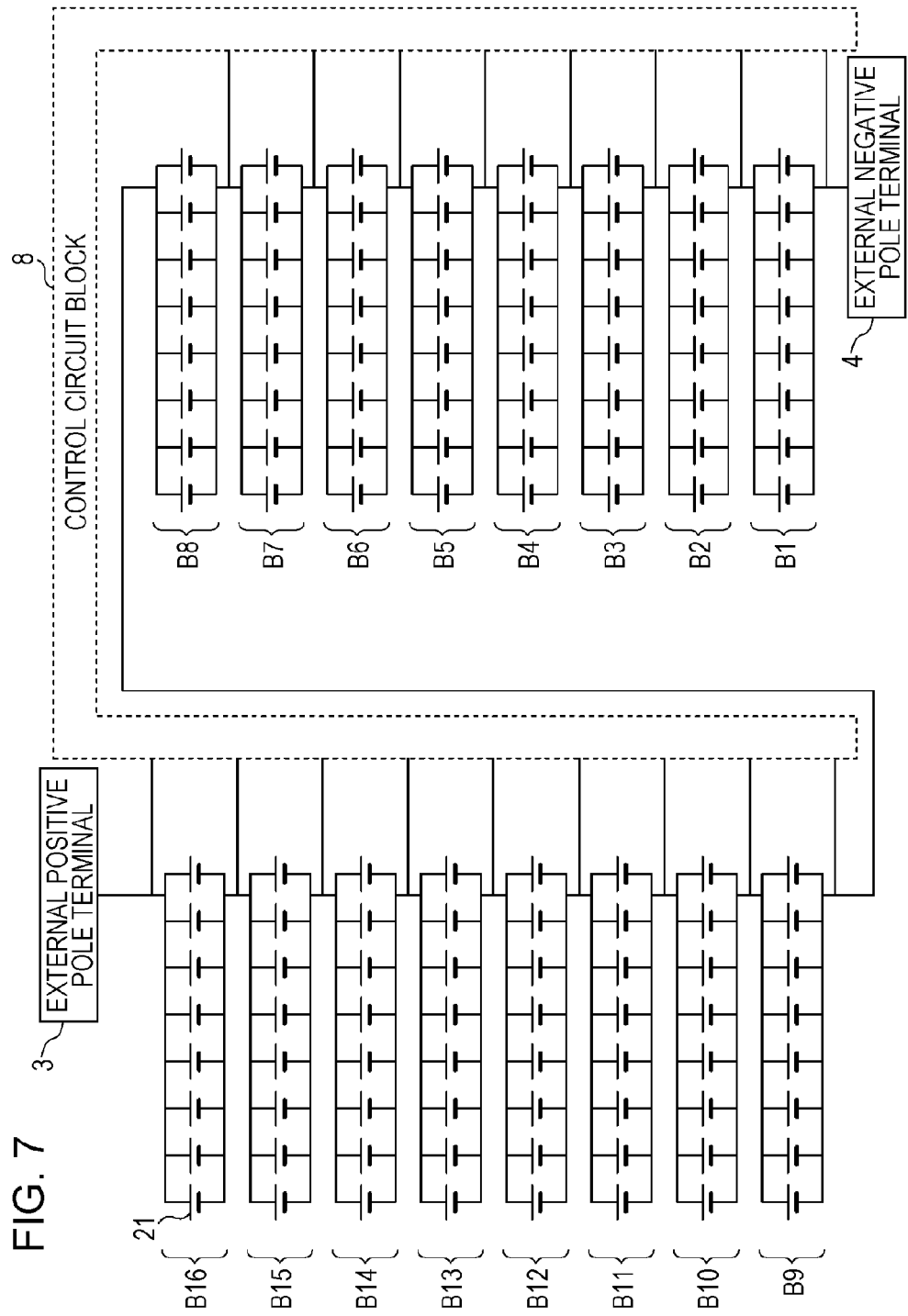
FIG. 7 is a connection diagram illustrating a connection relation of a battery included in the battery unit.

As shown in FIG. 7, the battery blocks B1 to B16 (which are appropriately referred to as battery blocks B when it is not necessary to distinguish the battery blocks) each having eight batteries connected to each other in parallel are connected to each other in series. The charging and discharging of each of the battery blocks B1 to B16 is controlled while being connected to the control block 8. The charging and discharging is performed through the external positive electrode terminal 3 and the external negative electrode terminal 4. For example, the battery blocks B1 to B6 are included in the sub-module AS1, and the battery blocks B11 to B16 are included in the sub-module AS2. Furthermore, the battery blocks B7 and B10 are included in the sub-module AS3, and the battery blocks B8 and B9 are included in the sub-module AS4.

Sub-Module

Figure 8:
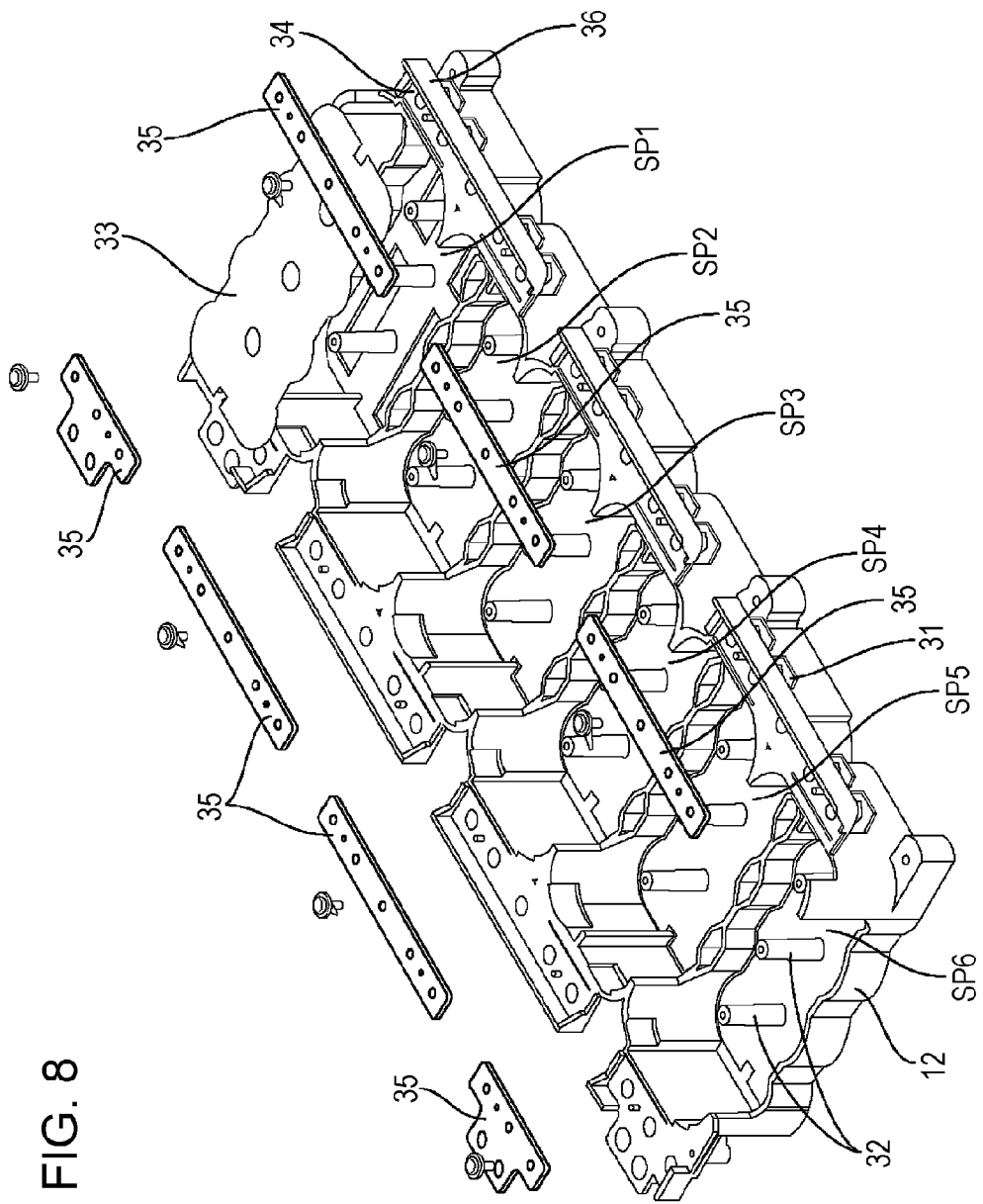
FIG. 8 is a perspective view illustrating an example of a lower casing of the sub-module.
Figure 9:
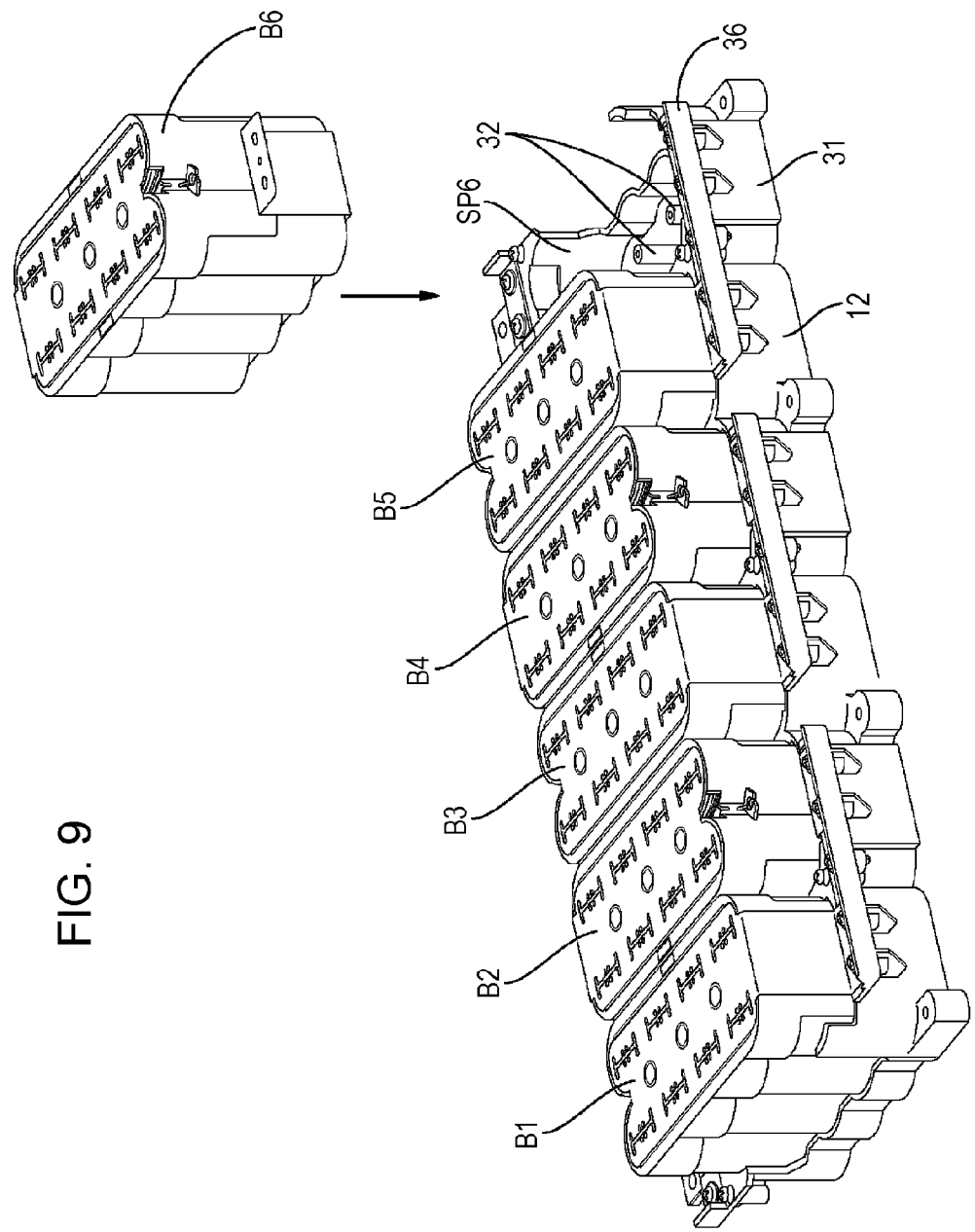
FIG. 9 is a perspective view illustrating a state where a battery block is disposed with respect to the lower casing.
Figure 10:
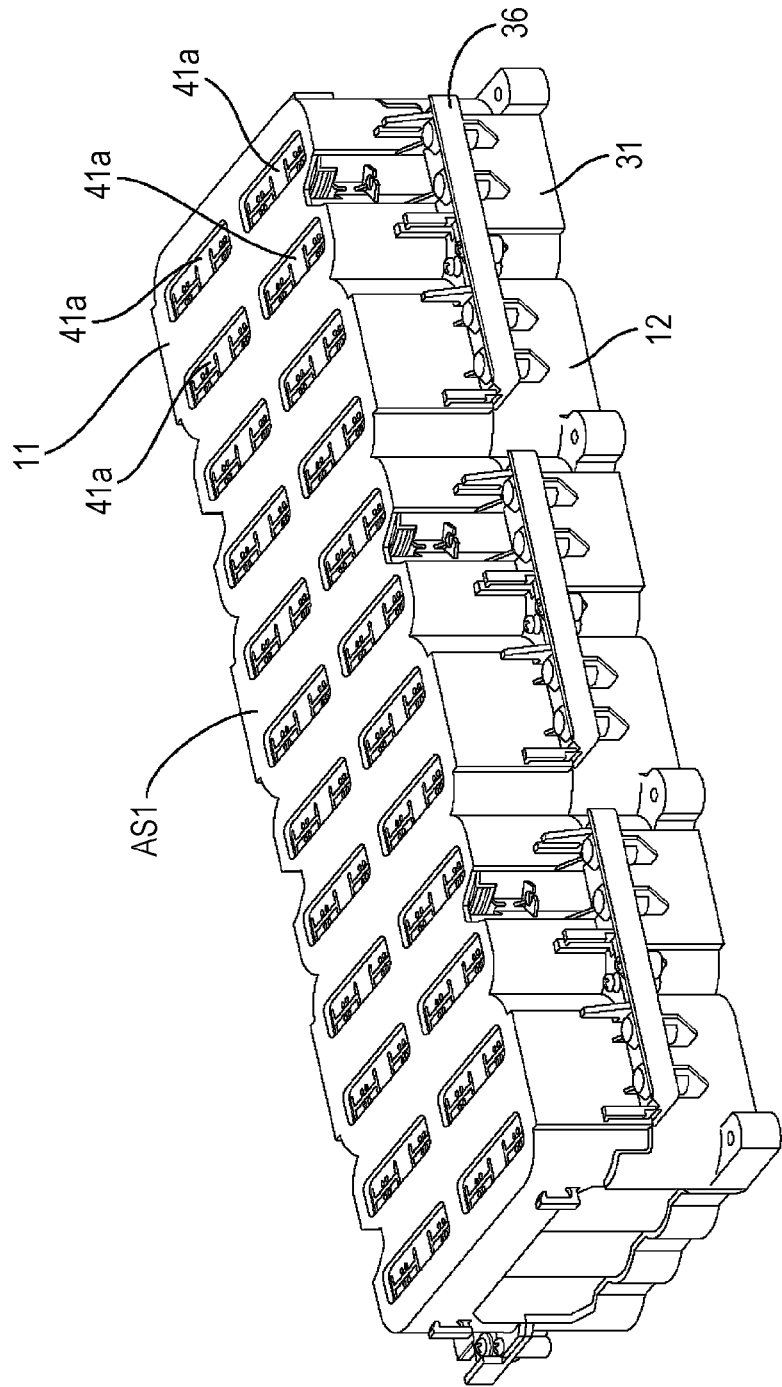
FIG. 10 is a perspective view illustrating an example of the sub-module configured to be covered by the upper casing.

Referring to FIGS. 8, 9, and 10, the sub-module, for example, the sub-module AS1 will be described. Furthermore, the sub-module AS2 also has the same structure as that of the sub-module AS1. As shown in FIG. 8, the lower casing 12 as a molding component is formed in a shallow box shape with a side wall 31 provided in the periphery thereof. The accommodation portion of the lower casing 12 is segmented into six accommodation spaces SP1 to SP6 by ribs.

The battery blocks B have the same shape. The accommodation spaces SP1 to SP6 formed in the lower casing 12 substantially have the same outlines of the bottom surfaces of the battery blocks B. The bottom surface of the battery block B is a positive electrode terminal surface or a negative electrode terminal surface. The battery blocks B1 to B6 are respectively accommodated in the accommodation spaces SP1 to SP6. In this case, the bottom surfaces of the battery blocks B are substantially formed in a rectangular shape, and a positive electrode metallic sheet and a negative electrode metallic sheet are respectively drawn out from both short sides thereof as described below. Accordingly, in the accommodation spaces SP1 to SP6, the positive and negative polarities of the drawn portions exposed to the outside of the casing are reversed in accordance with the accommodation direction of the battery block B. That is, the connection between the battery blocks may be appropriately set in accordance with the accommodation direction of the battery block B.

The bottom surface of the lower casing 12 and the ribs and the side wall 31 may regulate the position of the battery block when the battery block is accommodated therein. That is, the accommodation space may be formed so as to cover a part of the bottom surface and the peripheral surface of the battery block. Accordingly, even when external vibration or impact is applied to the battery unit 1, so that it is transferred to the battery block, the positional regulation of the battery may be maintained and a high degree of safety may be obtained.

Three fastening portions 32 protrude from each of the bottom surfaces of the accommodation spaces SP1 to SP6 so as to attach the battery blocks thereto. The formation positions of the fastening portions 32 match the positions of the gaps formed when arranging, for example, eight cylindrical batteries included in the battery block. Further, a shock absorbing sheet 33 is disposed at the bottom surface, and the shock absorbing sheet 33 is interposed between the bottom surface of the battery block B and the bottom surface of the lower casing 12. Due to the shock absorbing sheet 33, the battery block may be protected by preventing impact or vibration applied to the battery unit 1 from being directly transferred thereto. For example, when the battery unit 1 is vibrated, the shock absorbing sheet 33 may dampen the vibration. It is desirable that the shock absorbing sheet 33 have a high shock absorption property and a high heat transfer rate.

A connection portion 34 is provided so as to protrude outward from the side surface of the lower casing 12 in the lateral direction, and a connection member used for the electric connection between the battery blocks is disposed thereon. The connection member, for example, a bus-bar 35 is disposed at the connection portion 34, and the bus-bar 35 is fixed to the lower casing 12 by a screw. The battery blocks B1 to B6 are connected to each other in series through the bus-bar 35. A substantially perpendicular sheet-like rib 36 is formed along the outer end of the bus-bar 35. Due to the sheet-like rib 36, the bus-bar 35 disposed at the connection portion 34 does not easily contact the other positions.

As shown in FIG. 9, the battery blocks B1 to B6 are respectively inserted and disposed at the accommodation spaces SP1 to SP6 of the lower casing 12. For example, the battery block B6 is disposed at the accommodation space SP6. The battery block B6 disposed at the lower casing 12 is fixed to the lower casing 12 using the fastening portion 32. The specific structure of the battery block B will be described later.

When a predetermined number of battery blocks B1 to B6 are attached to the lower casing 12, as shown in FIG. 10, the battery blocks may be covered by the upper casing 11. The upper casing 11 is fixed to the battery blocks B1 to B6 or the lower casing 12 by threading or the like, thereby assembling the sub-module AS1. The upper casing 11 is a plastic molding component. The upper casing 11 covers the battery blocks B1 to B6 from the upside thereof so as to cover the entire portion exposed to the upside from the lower casing 12 of the battery blocks B1 to B6 accommodated in the lower casing 12. The upper surface sheet of the upper casing 11 is provided with four rectangular openings (referred to as slits) 41*a* corresponding to the positions of the battery blocks. A heat radiation rubber is inserted and disposed at each slit 41*a* as described below. Furthermore, the slit 41*b* which is the same as the slit 41*a* is formed on the bottom surface sheet of the lower casing 12.

Figure 11:
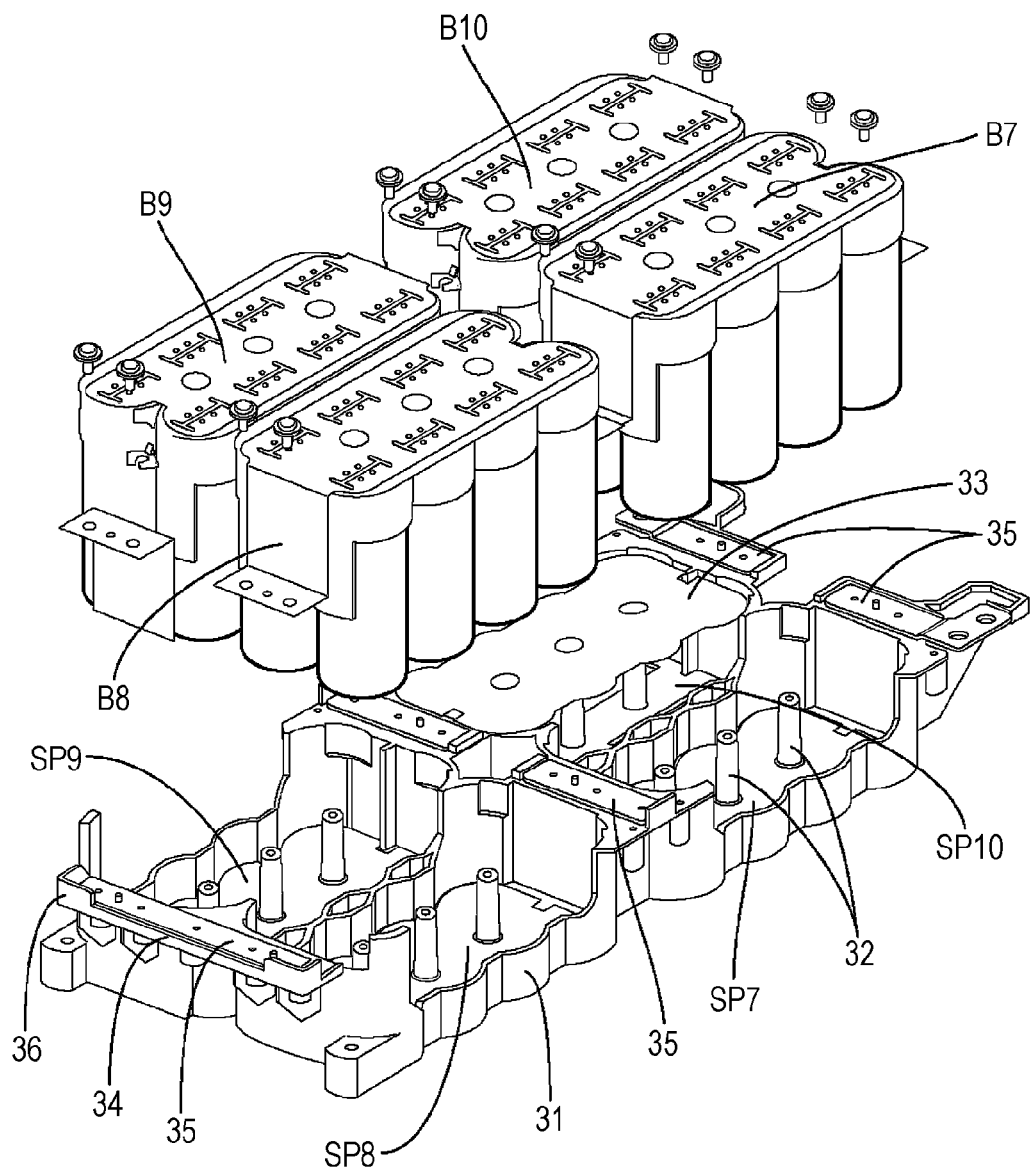
FIG. 11 is a perspective view illustrating another example of the lower casing and the battery block disposed with respect to the lower casing.
Figure 12:
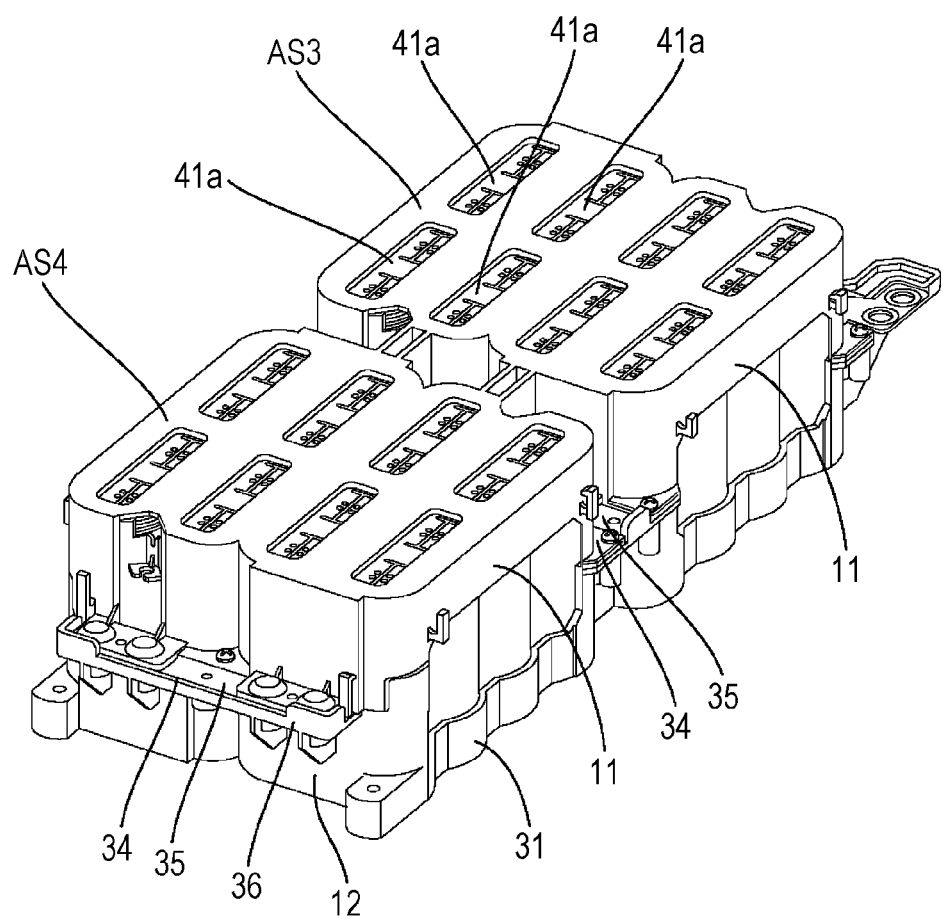
FIG. 12 is a perspective view illustrating another example of the sub-module provided to be covered by the upper casing.

Referring to FIGS. 11 and 12, the sub-modules AS3 and AS4 will be described. As shown in FIG. 11, the sub-module AS3 and AS4 have the common lower casing 12 and the separate upper casings 11. The lower casing 12 is formed in a shallow box shape with a side wall 31 provided in the periphery thereof. The accommodation portion of the lower casing 12 is segmented into four accommodation spaces SP7 to SP10 by the ribs and the connection portions 34. The battery blocks B7 to B10 are respectively accommodated in the accommodation spaces SP7 to SP10.

Three fastening portions 32 protrude from each bottom surface of the accommodation spaces SP7 to SP10 so as to attach the battery blocks thereto. Further, the shock absorbing sheet 33 is disposed at the bottom surface, and the shock absorbing sheet 33 is interposed between the bottom surface of the battery block B and the bottom surface of the lower casing 12. Due to the shock absorbing sheet 33, the battery block may be protected by preventing impact or vibration applied to the battery unit 1 from being directly transferred thereto. For example, when the battery unit 1 is vibrated, the shock absorbing sheet 33 may dampen the vibration. It is desirable that the shock absorbing sheet 33 have a high shock absorption property and a high heat transfer rate.

The bottom surface of the lower casing 12 and the ribs and the side wall 31 may regulate the position of the battery block when the battery block is accommodated therein. That is, the accommodation space may be formed so as to cover a part of the bottom surface and the peripheral surface of the battery block. Accordingly, even when external vibration or impact is applied to the battery unit 1, so that it is transferred to the battery block, the positional regulation of the battery may be maintained and a high degree of safety may be obtained.

The connection portion 34 is provided so as to protrude outward from the side surface of the lower casing 12 in the longitudinal direction, and a connection member used for the electric connection between the battery blocks is disposed thereon. The connection member, for example, a bus-bar 35 is disposed at the connection portion 34, and the bus-bar 35 is fixed to the lower casing 12 by a screw. Further, the connection portion 34 is formed even at the boundary position between the accommodation spaces SP7 and SP10 and the accommodation spaces SP8 and SP9. The bus-bar 35 is disposed at the connection portion 34, and the bus-bar 35 is fixed by a screw. The battery blocks B7 to B10 are connected to each other in series by the bus-bar 35. The substantially perpendicular sheet-like rib 36 is formed along the outer end of the bus-bar 35. Due to the sheet-like rib 36, the bus-bar 35 disposed at the connection portion 34 does not easily contact the other positions.

As shown in FIG. 12, the battery blocks B7 to B10 are respectively inserted and disposed at the accommodation spaces SP7 to SP10 of the lower casing 12. The battery blocks B7 to B10 disposed at the lower casing 12 are fixed to the lower casing 12 using the fastening portion 32. When the battery blocks B7 to B10 are attached to the lower casing 12, as shown in FIG. 12, the separated upper casings 11 cover the battery blocks.

The upper casing 11 is fixed to the battery blocks B7 and B10 or the lower casing 12 by threading or the like, thereby assembling the sub-module AS3. The upper casing 11 is fixed to the battery blocks B8 and B9 or the lower casing 12 by threading or the like, thereby assembling the sub-module AS4. The upper casing 11 is a plastic molding component. The upper casing 11 covers the battery blocks B7 and B10 so as to cover the entire part exposed to the upside from the lower casing 12 of the battery blocks B7 and B10 accommodated in the lower casing 12. In this manner, the upper casing 11 covers the battery blocks B8 and B9. The upper surface sheet of the upper casing 11 is provided with four slits 41*a* corresponding to each battery block. The heat radiation rubber is inserted and disposed at the slit 41*a* as described below.

As described above, the battery blocks are formed as the sub-module, and the sub-module is attached inside the external casing. Accordingly, the plurality of battery blocks may be formed as the sub-module outside the external casing before assembling the sub-module inside the external casing. Accordingly, there are advantages as follows compared to the case where the plurality of battery blocks is directly assembled to the external casing.

Since the plurality of battery blocks is assembled in the casing of the sub-module outside the external casing, the workability may improve.

Since the battery blocks may be connected and assembled outside the metallic external casing, there is no danger of short-circuiting caused by components contacting and dropping, and work may be safely performed.

Since the sub-module is used which accommodates the battery block in the insulated molding casing, there is no danger of short-circuiting when each sub-module is assembled and disposed in the metallic external casing, and work may be safely performed.

Since the battery block is covered by the insulation casing even after the sub-module is disposed and fixed into the external casing, the insulation against the external casing is ensured even when vibration and impact are applied thereto, thereby ensuring safety.

Battery Block

Figure 13:
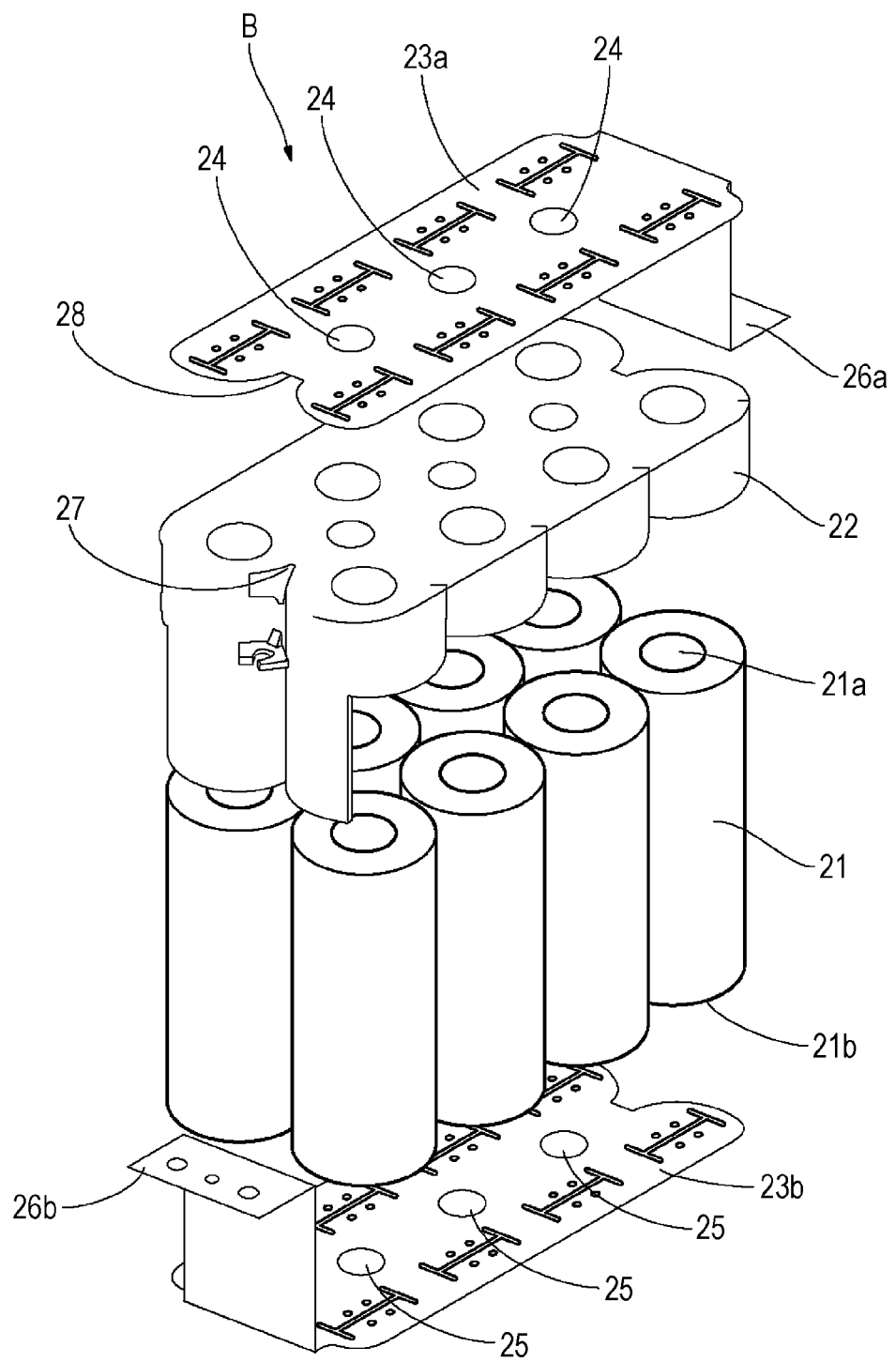
FIG. 13 is an exploded perspective view illustrating an example of the battery block.

FIG. 13 is a perspective view illustrating an example of a structure of the battery block B. The battery block B includes a plurality of, for example, eight batteries 21, a battery holder 22, a positive electrode metallic sheet 23a, and a negative electrode metallic sheet 23b, and the battery block B is assembled by these components. As the battery holder 22, for example, an insulating material such as plastic may be exemplified.

The battery 21 is, for example, a cylindrical battery having a positive electrode terminal portion 21a and a negative electrode terminal portion 21b provided at both ends thereof. Furthermore, the shape of the battery is not limited to the cylindrical shape, and batteries with various shapes such as a square shape may be used. The battery 21 is, for example, a secondary battery which may be repeatedly used. As such a secondary battery, for example, a lithium ion secondary battery, a lithium ion polymer secondary battery, or the like may be exemplified.

It is desirable to use coppery alloy or a material similar thereto as the material of the positive electrode metallic sheet 23a and the negative electrode metallic sheet 23b. Accordingly, an interconnection may be performed with low resistance. For example, the material of each of the positive electrode metallic sheet 23a and the negative electrode metallic sheet 23b may be nickel or nickel alloy. Accordingly, the positive electrode metallic sheet 23a and the negative electrode metallic sheet 23b may be satisfactorily welded to the positive electrode terminal portion 21a and the negative electrode terminal portion 21b of the battery 21. For example, the surface of the material of each of the positive electrode metallic sheet 23a and the negative electrode metallic sheet 23b may be subjected to plating of tin or nickel. Accordingly, it is possible to prevent rust from being generated due to the oxidization of the surface of the material of each of the positive electrode metallic sheet 23a and the negative electrode metallic sheet 23b.

The positive electrode terminal portions and the negative electrode terminal portions of the plurality of batteries 21 are arranged on the same surface. For example, one-side ends corresponding to the positive electrode terminal portions 21a of the plurality of batteries 21 may be fixed by the battery holder 22, and the other-side ends corresponding to the negative electrode terminal portions 21b may be fixed by the negative electrode metallic sheet 23b. The positive electrode metallic sheet 23a is provided with three holes 24, and the negative electrode metallic sheet 23b is provided with three holes 25. Furthermore, the battery holder is also provided with three holes. These holes are respectively provided at positions corresponding to the positions of the fastening portions 32 protruding from the bottom surface of the lower casing 12. The fastening portions 32 penetrate the gaps in the arrangement of the batteries 21. Accordingly, the battery block B may be fixed to the lower casing 12 by a screw even in the state where the battery block B is accommodated in the accommodation space of the lower casing 12.

A notch 27 is formed at the upper surface sheet of the battery holder 22, and a notch 28 is formed at the positive electrode metallic sheet 23a so as to correspond to the notch 27. An attachment concave portion (not shown) is formed at a part of the upper surface of the battery holder 22 below the notches 27 and 28 so as to be opened toward the upper end. As described below, the concave portion is provided so as to attach a temperature detection element, for example, a thermistor to the peripheral surface of the battery 21.

The positive electrode metallic sheet 23a is disposed on the battery holder 22 fixing one end of the battery 21, and the positive electrode terminals 21a of the plurality of batteries 21 is mechanically and electrically connected to the positive electrode metallic sheet 23a. On the other hand, the negative electrode metallic sheet 23b is disposed so as to fix the other end of the battery 21, and the negative electrode terminal portions 21b of the plurality of batteries 21 is mechanically and electrically connected to the negative electrode metallic sheet 23b. When the positive electrode metallic sheet 23a and the negative electrode metallic sheet 23b are disposed in this manner, the plurality of batteries 21 are electrically connected to each other in parallel.

Since both ends of the plurality of batteries 21 are fixed by the accommodation space of the lower casing 12 and the battery holder 22, when vibration or impact is applied to the battery unit 1, the contact point between the positive electrode terminal portion 21a and the positive electrode metallic sheet 23a and the contact portion between the negative electrode terminal portion 21b and the negative electrode metallic sheet 23b may be protected. Further, it is possible to insulate the portion having polarity opposite to the polarity of the contact point between the positive electrode metallic sheet 23a and the negative electrode metallic sheet 23b due to the battery holder 22 and the lower casing 12. For example, the battery holder 22 electrically insulates the positive electrode metallic sheet 23a from the negative electrode portion of the battery 21.

The positive electrode metallic sheet 23a is formed in an L-shape as a whole. The positive electrode metallic sheet 23a includes a terminal connection portion and a drawn portion 26a bent with respect to the terminal connection portion. One peripheral surface of the terminal connection portion is mechanically and electrically bonded to the positive electrode terminal portions 21a of the plurality of batteries 21 fixed by the battery holder 22. As the bonding method, for example, electrical resistance welding or welding using heat generated by a laser beam may be exemplified, but the disclosure is not particularly limited to these methods. For example, an ordinary welding method may be appropriately used. The tip of the drawn portion 26a is provided with a connection portion which is uprightly formed with respect to the drawn portion 26a. The connection portion is provided with one or a plurality of screw holes.

The negative electrode metallic sheet 23b is formed in an L-shape as a whole. The negative electrode metallic sheet 23b includes a terminal connection portion and a drawn portion 26b bent with respect to the terminal connection portion. One peripheral surface of the terminal connection portion is mechanically and electrically bonded to the negative electrode terminal portions 21b of the plurality of batteries 21. As the bonding method, for example, electrical resistance welding or welding using heat generated by a laser beam may be exemplified, but the disclosure is not particularly limited to these methods. For example, an ordinary welding method may be appropriately used. The tip of the drawn portion 26b is provided with a connection portion which is uprightly formed with respect to the drawn portion 26b. The connection portion is provided with one or a plurality of screw holes.

The drawn portion 26a of the positive electrode metallic sheet 23a and the drawn portion 26b of the negative electrode metallic sheet 23b are respectively drawn outward in the vertical direction of the plurality of batteries 21 arranged according to the matrix of 2 by 4, and are derived from the opposite surfaces of the arranged batteries. When the battery block B is rotated by 180°, the drawing direction of the positive electrode metallic sheet 23a and the negative electrode metallic sheet 23b may be reversed.

Thermistor Attachment Structure

Referring to FIGS. 14A, 14B, and 14C, a thermistor attachment structure will be described. FIG. 14B is a diagram magnifying a part XIVB of FIG. 14A, and FIG. 14C is a diagram magnifying a part XIVC of FIG. 14A. As shown in FIG. 14C, a slit-like notch 51 is formed so as to extend downward from the edge of the upper surface of the upper casing 11 of each sub-module, for example, the sub-module AS1. The notch 51 is formed at one position (or two positions including the opposite one position) of each battery block constituting the sub-module AS1. The position of the notch 51 is the same as the position of the notch 27 of the battery holder 22 and the position of the notch 28 of the positive electrode metallic sheet 23a.

An attachment concave portion 52 is formed above the notches and within the width of the notch 51 so as to be notched downward from the upper end surface of the battery holder 22. The lower edge of the concave portion 52 is provided with a slit 53. Specifically, a thermistor element and a connector are mounted on a small substrate. A thermistor is attached by inserting the substrate into the slit 53. The peripheral surface of the inner battery 21 is exposed through the concave portion 52, and whether the thermistor is bonded to the battery from the outside may be reliably checked. The substrate inserted into the slit 53 of the concave portion 52 is thermally bonded to the peripheral surface of the battery. The substrate having a thermistor and a connector mounted thereon is bonded to the peripheral surface of the battery 21 by, for example, an adhesive with a satisfactory heat transfer property. Furthermore, the thermistor may be directly attached without using the substrate.

The battery holder 22 below the concave portion 52 is provided with a locking sheet 54 having a hole. The locking sheet 54 is provided to fix a lead wire. Furthermore, the lead wire is connected to the control unit inside the control block 8 through the bus-bar or the like. Such a thermistor attachment structure may enable the attachment or detachment of the thermistor for maintenance even in the state where the sub-module is assembled and the battery 21 is covered by the casing.

Structure for Emitting Heat of Battery inside Sub-module

Generally, the battery inside the sub-module radiates heat during the charging and discharging thereof, and the performance of the battery is gradually degraded. Accordingly, it is necessary to suppress heating or radiate heat. Furthermore, since a difference in temperature occurs due to the arrangement place of the batteries, the batteries may not have uniform performance.

Figure 15A:
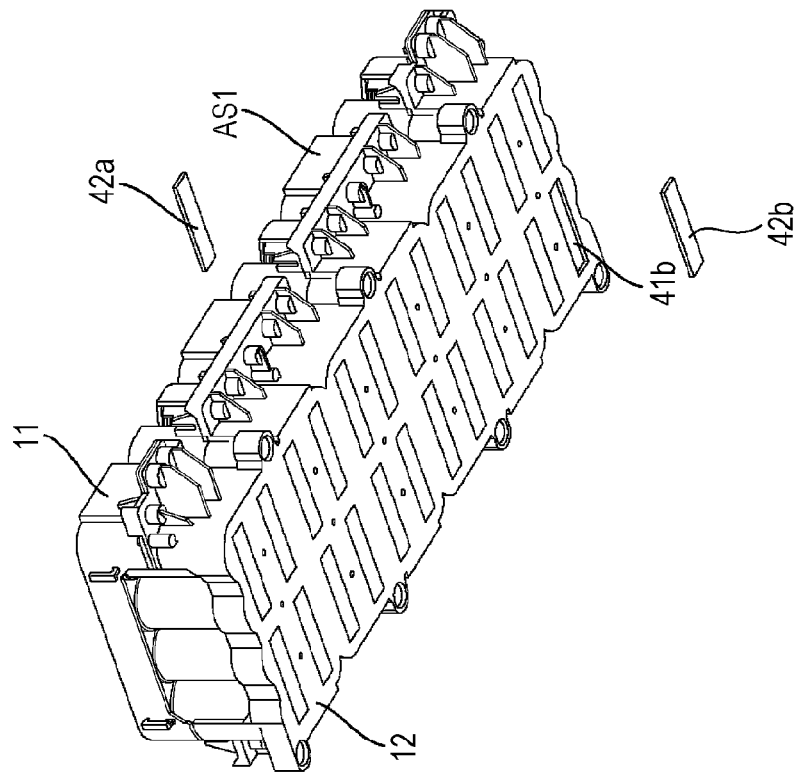
FIGS. 15A and 15B are cross-sectional views illustrating the attachment of the heat radiation rubber.
Figure 15B:
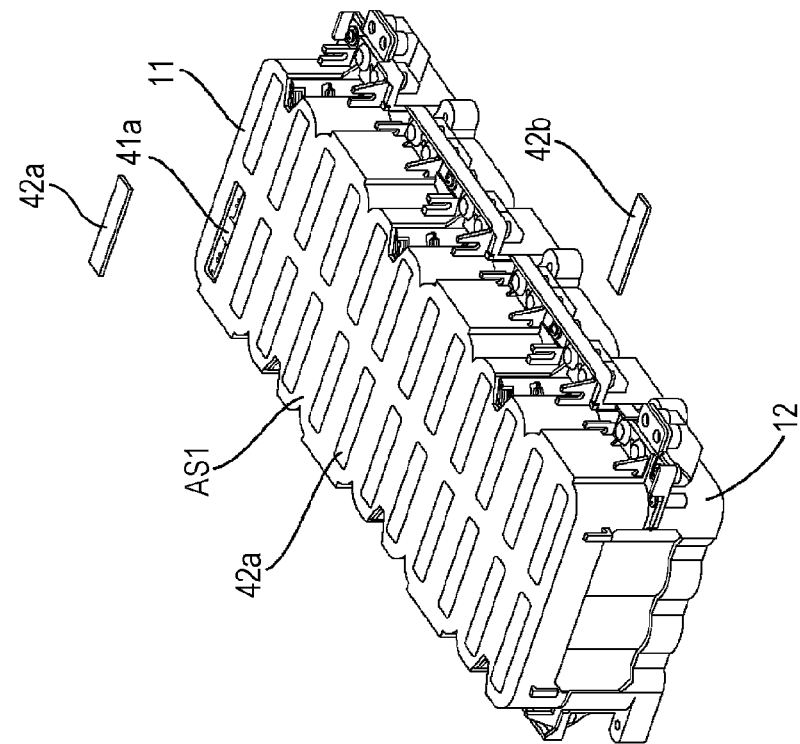

In one embodiment, the degradation of the performance of the battery due to heating is prevented, and a difference in temperature between batteries is suppressed. As an example, in the sub-module AS1, for example, as shown in FIGS. 15A and 15B, a slit 41a is formed in the upper surface sheet of the upper casing 11. A slit 41b is formed at the bottom surface sheet of the lower casing 12. Heat radiation rubbers 42a and 42b as shock absorbing and heat radiating portions are respectively fitted to the slits 41a and 41b, and are fixed thereto by adhering or the like if necessary. The attachment of the heat radiation rubbers 42a and 42b with respect to the slits 41a and 41b is performed at the outside of the external casing. The heat radiation rubbers 42a and 42b are formed of a material having a satisfactory heat transfer property, a shock absorbing characteristic, and a heat resistance property, for example, silicon. Furthermore, the heat radiation rubbers 42a and 42b may have a structure (for example, a laminated structure) formed by the combination of a heat transfer material having a satisfactory heat transfer property and a shock absorbing material having a satisfactory heat resistance property and a satisfactory shock absorbing characteristic. Moreover, the heat radiation rubbers 42a and 42b may be integrally formed with the casings 11 and 12 when molding the casings 11 and 12.

As shown in a schematic cross-sectional view of FIG. 16, the heat radiation rubber 42b is interposed so as to bury a gap between the lower surface of each battery block of the sub-module AS1 and the inner surface of the external lower casing 2a. The heat radiation rubber 42a is interposed so as to bury a gap between the upper surface of each battery block of the sub-module AS1 and the inner surface of the external upper casing 2b. Heat generated from the battery of the sub-module AS1 is radiated through the heat radiation rubbers 42a and 42b to the outside of the metallic external casing (2a and 2b). Furthermore, although the sub-module AS1 is described, the other sub-modules AS2, AS3, and AS4 also have the same heat radiation structure.

In such a heat radiation structure, since four slits and four heat radiation rubbers are disposed at the upper and lower surfaces of each battery block, the heat may be highly efficiently and uniformly radiated in the overall battery unit. Furthermore, since the heat radiation rubbers 42a and 42b have a satisfactory shock absorbing characteristic, the battery may be protected from vibration and impact due to dropping. Furthermore, since an opening such as a slit is provided in the casing of the sub-module and the heat radiation rubber is disposed at the opening, the position of the heat radiation rubber is regulated by the opening, thereby preventing a deviation of the position of the heat radiation rubber.

Structure of Heating Battery inside Sub-module

Generally, the battery inside the sub-module is gradually degraded when being charged in a low-temperature environment (for example, 0° C. or less). Further, in the case of discharging, the internal resistance increases, so that the capacitance reduces. Likewise, there was a problem in that the performance of the battery was not sufficiently exhibited in the low-temperature environment. In one embodiment, the damage of the performance of the battery is prevented even when the charging and discharging is performed in the low-temperature environment.

Figure 17:
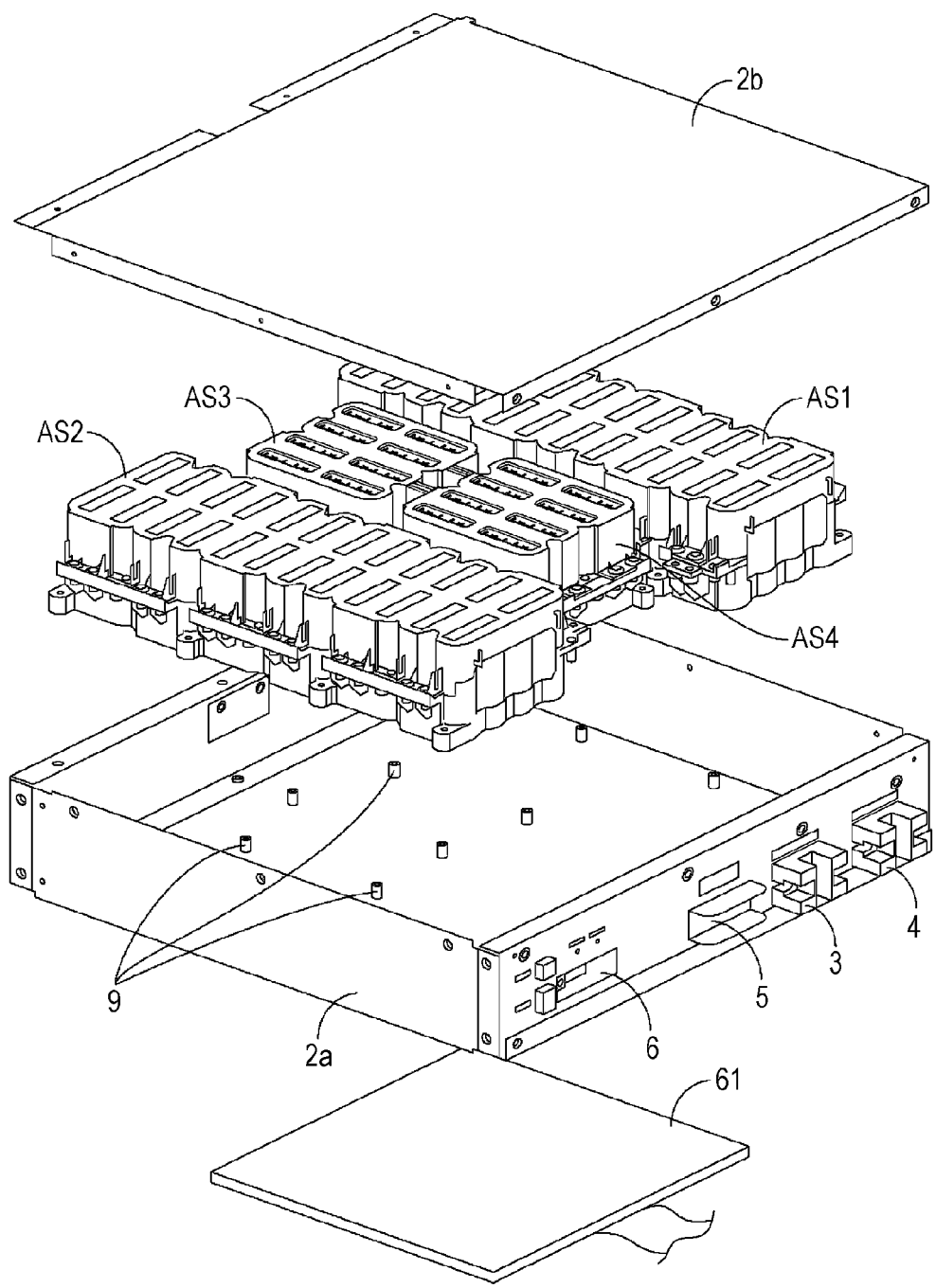
FIG. 17 is a perspective view illustrating an example of a heating structure. Additional features and advantages are described herein, and will be apparent from the following Detailed Description and the figures.

As shown in FIG. 17, a flat heater 61 is disposed at the bottom surface of the external lower casing 2a of the battery unit. The heater 61 is provided so as to adhere to the bottom surface. It is desirable that the heater 61 have sufficient heating performance, a thin thickness, and flexibility. As an example, since a silicon rubber heater has an extremely thin thickness and flexibility, such a condition may be satisfied. Furthermore, the heater may be provided at the upper surface of the external upper casing 2b, and the heater may be provided at both the upper and lower surfaces of the external casing (2a and 2b). The heater 61 is driven in accordance with the ambient temperature or the temperature of the battery. For example, when the ambient temperature becomes around 0° C., the driving of the heater 61 is started. Then, when the ambient temperature or the temperature of the battery becomes more than a predetermined value, the operation is stopped.

In one embodiment, since the heat radiation rubbers 42a and 42b are provided, heat generated by the heater 61 may be easily and uniformly transferred to the batteries inside the sub-module. Accordingly, a deviation in temperature due to the arrangement or the positions of the batteries inside the casing may be suppressed as much as possible, and degradation of the performance of the battery may be prevented.

As described above, since the temperature detection element (thermistor) is attached to the battery of each battery block, a temperature control may be highly efficiently performed when radiating heat from the battery or heating the battery.

Modified Example

While one embodiment of the disclosure has been specifically described, the disclosure is not limited to the above-described embodiment, and various modifications based on the technical spirit of the disclosure may be made. For example, in the battery block, the negative electrode terminal portion 21b of the battery 21 is connected by the negative electrode metallic sheet 23b, but a structure may be adopted in which the negative electrode side is held by the battery holder and the positive electrode side is connected by the positive electrode metallic sheet 23a. Furthermore, the structure, the method, the shape, the material, and the like exemplified in the above-described embodiment are merely an example, and if necessary, a structure, method, shape, material, numerical value, and the like different therefrom may be used. Further, the respective structures of the above-described embodiment may be combined with each other as long as it does not deviate from the spirit of the disclosure.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A battery unit comprising:
    a main accommodation casing that includes a power output terminal; and
    a plurality of sub-modules accommodated in the main accommodation casing, wherein each sub-module includes a plurality of battery blocks, and each battery block includes a plurality of unit batteries connected to each other, a battery holder, a negative electrode terminal, and a positive electrode terminal, the positive electrode terminal including a metallic sheet with a plurality of connection points to a positive electrode terminal of each of the plurality of unit batteries disposed on the battery holder, wherein the battery holder includes a notch formed in a surface of the battery holder that contacts the metallic sheet of the positive electrode terminal, and wherein the battery holder further comprises, below a concave portion, a locking sheet having a hole, the locking sheet provided in a location adjacent to the notch.

2. The battery unit according to claim 1, further comprising:
    an upper insulation casing configured to cover the plurality of battery blocks accommodated within each sub-module from an upside thereof so as to cover the entire portion exposed to the upside from a lower insulation casing into which the battery blocks are respectively inserted, wherein the positive and negative electrode terminals of each battery block are covered by the upper and lower insulation casings such that each sub-module is electrically isolated from each other.

3. The battery unit according to claim 2,
    wherein the upper and lower insulation casings constitute a sub-accommodation casing segmented into an upper casing and a lower casing.

4. The battery unit according to claim 2,
    wherein the battery blocks are electrically connected to each other in series through an electric connection member that is fixed to the lower insulation casing.

5. The battery unit according to claim 1,
    wherein a battery block fixes a plurality of unit batteries by a battery holder formed of an insulating material.

6. The battery unit according to claim 1,
    wherein the plurality of unit batteries are fixed by the positive electrode metallic sheet.

7. The battery unit according to claim 1,
    wherein a shock absorbing and heat radiating portion having a heat transfer property and a shock absorbing characteristic is interposed between an inner surface of the main accommodation casing and a sub-module.

8. The battery unit according to claim 7,
    wherein a plurality of openings is formed in at least one of an upper surface and a bottom surface of a sub-accommodation casing comprising upper and lower insulation casings, and the shock absorbing and heat radiating portion is disposed for each opening.

9. The battery unit according to claim 1,
    wherein a plurality of holes is formed in a sub-accommodation casing comprising upper and lower insulation casings, and a temperature detection element is attached to a surface of an inner unit battery through the holes.

10. The battery unit according to claim 9,
    wherein the temperature detection element is attached to a surface of the unit battery through a connection member having a heat transfer property.

11. The battery unit according to claim 1,
    wherein a flat heat radiation portion is disposed in at least one of a bottom surface and an upper surface of the main accommodation casing.

12. The battery unit according to claim 1, further comprising:
    a control unit that is accommodated in the main accommodation casing and controls at least one of charging and discharging of each of the plurality of battery blocks including the plurality of unit batteries.

* * * * *